(12) United States Patent
Melou

(10) Patent No.: US 11,220,241 B2
(45) Date of Patent: Jan. 11, 2022

(54) OUTSIDE VIEWING DEVICE FOR A VEHICLE, COMPRISING A CAMERA

(71) Applicants: Continental Automotive France, Toulouse (FR); Continental Automotive GmbH, Hannover (DE)

(72) Inventor: Stéphane Melou, Rambouillet (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/488,649

(22) PCT Filed: May 17, 2018

(86) PCT No.: PCT/FR2018/051194
§ 371 (c)(1),
(2) Date: Aug. 26, 2019

(87) PCT Pub. No.: WO2018/211225
PCT Pub. Date: Nov. 22, 2018

(65) Prior Publication Data
US 2020/0398791 A1  Dec. 24, 2020

(30) Foreign Application Priority Data
May 19, 2017  (FR) ...................................... 1754442

(51) Int. Cl.
*B60S 1/08* (2006.01)
*H04N 5/225* (2006.01)
(Continued)

(52) U.S. Cl.
CPC ............. *B60S 1/0848* (2013.01); *B60R 11/04* (2013.01); *B60S 1/026* (2013.01); *B60S 1/087* (2013.01);
(Continued)

(58) Field of Classification Search
CPC ........ B60R 11/04; B60S 1/026; B60S 1/0848; B60S 1/0866; B60S 1/087; B60S 1/485;
(Continued)

(56) References Cited

U.S. PATENT DOCUMENTS

| | | | |
|---|---|---|---|
| 2015/0077539 A1 | 3/2015 | Jansen et al. | |
| 2017/0244873 A1* | 8/2017 | Izabel | ..................... B60R 11/04 |
| 2018/0001837 A1* | 1/2018 | Trebouet | ................... B08B 3/02 |

FOREIGN PATENT DOCUMENTS

| | | |
|---|---|---|
| DE | 102016006039 A1 | 11/2016 |
| EP | 1308747 A2 | 5/2003 |

(Continued)

OTHER PUBLICATIONS

English Translation of the Written Opinion for International Application No. PCT/FR2018/051194, dated Oct. 9, 2018, 4 pages.

(Continued)

*Primary Examiner* — Md N Haque
(74) *Attorney, Agent, or Firm* — RatnerPrestia

(57) ABSTRACT

An outside viewing device for a vehicle, having a camera that is housed in a casing having a frontal wall through which there passes an imaging window, and an internal partition which is parallel to the frontal wall and through which there passes an opening next to the imaging window. In addition, two peripheral wiper seals, disposed at the periphery of the window and the opening, delimit a guide in which a transparent screen slides, in a sealed manner, between at least two imaging positions, in each of which different surface portions of the screen are positioned next to the imaging window. Finally, a device for moving the screen is designed to slide the latter between its different positions.

14 Claims, 2 Drawing Sheets

(51) Int. Cl.
*B60R 11/04* (2006.01)
*B60S 1/02* (2006.01)
*B60S 1/48* (2006.01)
*B60S 1/56* (2006.01)
*G02B 27/00* (2006.01)
*B60S 1/52* (2006.01)

(52) U.S. Cl.
CPC ............ *B60S 1/0866* (2013.01); *B60S 1/485* (2013.01); *B60S 1/56* (2013.01); *B60S 1/566* (2013.01); *G02B 27/0006* (2013.01); *H04N 5/2252* (2013.01); *H04N 5/22541* (2018.08); *B60S 1/52* (2013.01)

(58) Field of Classification Search
CPC ... B60S 1/52; B60S 1/56; B60S 1/566; G02B 27/0006; H04N 5/2252; H04N 5/22541
See application file for complete search history.

(56) References Cited

FOREIGN PATENT DOCUMENTS

| | | |
|---|---|---|
| WO | 8901643 A1 | 2/1989 |
| WO | 2013162372 A1 | 10/2013 |
| WO | 2016058871 A1 | 4/2016 |
| WO | 2016116231 A1 | 7/2016 |

OTHER PUBLICATIONS

International Search Report and Written Opinion for International Application No. PCT/FR2018/051194, dated Oct. 9, 2018—8 pages.

* cited by examiner

OUTSIDE VIEWING DEVICE FOR A VEHICLE, COMPRISING A CAMERA

CROSS REFERENCE TO RELATED APPLICATIONS

This application is the U.S. National Phase Application of PCT International Application No. PCT/FR2018/051194, filed May 17, 2018, which claims priority to French Patent Application No. 1754442, filed May 19, 2017, the contents of such applications being incorporated by reference herein.

FIELD OF THE INVENTION

The invention relates to an outside viewing device for a vehicle, having a camera.

BACKGROUND OF THE INVENTION

Increasingly, vehicles are equipped with cameras that are installed on the outside of said vehicles and are intended to assist drivers, such as cameras known as backup cameras that are used in particular during parking and or reversing maneuvers, and panoramic cameras that are used to make it easier for road vehicles of the heavy duty type to carry out maneuvers, etc.

One development aims, moreover, to use these cameras for "rearview" purposes, or, in other words, to replace the rearview mirrors of vehicles with cameras housed in profiled shells, having notably the advantage of exhibiting a drag coefficient that is notably less than that of traditional rearview mirrors.

All of these viewing devices make it necessary to ensure that the images transmitted by the cameras are sufficiently clear to be able to be used reliably. Thus, these devices should not be dirty and should be able to be cleaned easily, even automatically.

The current solution, as described in the patent application WO 2016/116231, incorporated herein by reference, consists in providing viewing devices comprising a cleaning head and a camera that are movable relative to one another between a cleaning position, in which they are next to one another, and an active imaging position in which they are spaced apart from one another.

Such a solution has the major drawback that the camera is put out of action while it is being cleaned. Although this putting out of action may be tolerated when the cameras are being used for driving assistance, it is, by contrast, entirely inconceivable for "rearview" purposes for safety reasons.

SUMMARY OF THE INVENTION

An aspect of the present invention aims to eliminate this drawback and provide a viewing device designed to ensure the clearness of images transmitted by the camera without requiring that the latter be temporarily put out of action.

To this end, an aspect of the invention relates to an outside viewing device for a vehicle, having a camera that is provided with a lens and is housed in a casing having, opposite said lens, a wall, known as the frontal wall, through which there passes an opening forming an imaging window of said camera, wherein, according to an aspect of the invention, this viewing device comprises:

provided in the casing, an internal partition which is at least substantially parallel to the frontal wall of said housing and through which there passes, next to the imaging window, an opening with dimensions at least substantially the same as those of said imaging window, positioned next to one another, at the periphery of the respective openings provided in the frontal wall and the internal partition, two peripheral wiper seals that delimit a longitudinal guide between said frontal wall and internal partition, a transparent screen with suitable dimensions for sliding longitudinally, in a sealed manner, in the guide delimited by the two peripheral wiper seals, between at least two imaging positions, in each of which different surface portions of said screen are positioned next to the imaging window, means for moving the screen that are designed to slide the latter between its different positions.

According to an aspect of the invention, the camera is thus housed in a sealed casing, which is sealed by a screen that is movable inside a guide designed, for the one part, to ensure that the casing is sealed, and, for the other part, to clean the screen when the latter moves between its different positions, without breaking this seal.

This viewing device therefore provides a sealed casing housing the camera, the imaging window of which is covered by a screen that is kept clean permanently, allowing the continuous operation of the camera under conditions that make it possible to ensure that the images transmitted are clear.

According to one advantageous embodiment of an aspect of the invention that aims to simplify the dynamics of movement of the screen in an optimal manner, the dimensions of this screen and the means for moving the latter are designed to make it possible to slide the latter along a back-and-forth path between two imaging positions: a first position in which a central surface portion is positioned next to the imaging window, and a second position in which an end surface portion is positioned next to said imaging window.

In addition, in order notably to reduce the dimensions of the casing, according to an aspect of the invention, the screen and the guide advantageously longitudinally have the shape of an arc of a cylinder with convexity oriented toward the frontal wall of the casing.

According to another advantageous embodiment of an aspect of the invention, the viewing device comprises a sensor for detecting the presence of liquid and dirt on the external face of the screen, said sensor being disposed in the casing opposite the imaging window.

In addition, means for detecting ambient light are advantageously designed, according to an aspect of the invention, to adjust the detection level of the sensor for detecting the presence of liquid and dirt depending on the ambient light.

Such a sensor for detecting the presence of liquid and dirt constitutes the control element for managing the movements of the screen and, according to one advantageous embodiment of an aspect of the invention, control means are designed such that said movement means are activated on the basis of the data supplied by said detection sensor.

According to another advantageous embodiment of an aspect of the invention, means for spraying a cleaning liquid are disposed so as to spray said liquid onto the outer face of that surface portion of the screen that is positioned next to the imaging window.

In addition, in order to optimize the dimensions of the casing, the frontal wall of the latter has a recess in which the imaging window is provided, and the spraying means for cleaning the outer face of the screen are housed in said casing and disposed so as to open into the recess in the frontal wall.

Furthermore, means for spraying a cleaning liquid are likewise disposed, advantageously according to an aspect of the invention, so as to spray said liquid onto the inner face of a surface portion of the screen that is situated in the casing on the outside of the guide.

According to another advantageous embodiment of an aspect of the invention, the viewing device comprises means for heating the screen that are servo-controlled by a temperature sensor so as to be triggered when there is a risk of water deposits in the form of mist, frost, snow, etc. forming on said screen.

In addition, the control means are then advantageously designed, according to an aspect of the invention, to prevent the activation of the means for moving the screen during the operation of the means for heating said screen, so as to avoid any damage to the means for moving the screen if snow, frost, etc. is present on the latter.

BRIEF DESCRIPTION OF THE DRAWINGS

Further features, aims and advantages of aspects of the invention will become apparent from the following detailed description with reference to the appended drawings, which show, by way of nonlimiting example, a preferred embodiment. In these drawings.

DETAILED DESCRIPTION OF THE PREFERRED EMBODIMENTS

Figure 1:
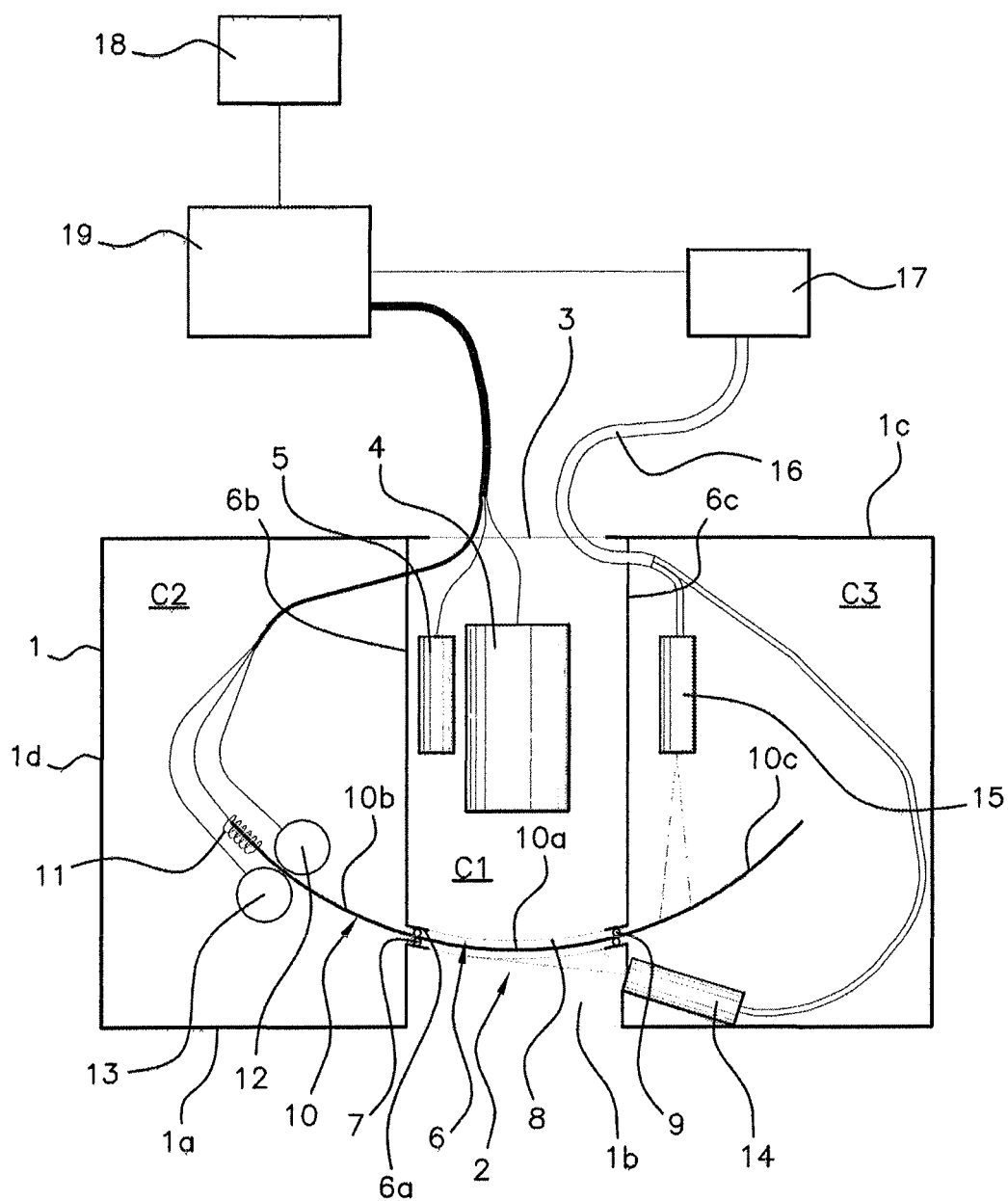
FIG. 1 is a schematic top view of a viewing device according to an aspect of the invention.

The viewing device shown in the figures is intended to be installed on the outside of a vehicle, for example instead of an exterior rearview mirror.

This viewing device comprises, first and foremost, a casing 1 of parallelepipedal overall shape in the example, having a forward frontal wall 1a having a median recess 1b, a rear frontal wall is in which an orifice 3 for electrically and hydraulically connecting said casing 1 is provided, and two transverse walls such as 1d extending between the two frontal walls 1a, 1c.

The forward frontal wall 1a also has, passing through it, an imaging window 2, of rectangular shape in the example, which is provided in the recess 1b and at the periphery of the internal face of which a wiper seal 7 such as a lip seal is secured.

On the inside, the housing 1 incorporates a partition 6 with the overall shape of a U formed:
- by a frontal internal wall 6a which is parallel to the frontal wall 1a of said casing 1, is provided next to the recess 1b and has, passing through it, next to the imaging window 2, an opening 8 with the same shape and dimensions as those of said imaging window 2, at the periphery of the external face of which (face situated opposite the frontal face 1a of the casing 1) a wiper seal 9 such as a lip seal delimiting a longitudinal guide with the wiper seal 7 is secured,
- by two internal transverse walls 6b, 6c that connect the internal frontal wall 6a to the rear frontal wall 1c of the casing 1 and divide the internal volume of the latter into three compartments consisting of a central compartment C1 and, on either side of the latter, two lateral compartments C2 and C3.

The casing 1 also incorporates a screen 10 made of a transparent material such as glass or a plastics material such as poly(methyl methacrylate) (PMMA) with a suitable shape for sliding in a sealed manner inside the guide delimited by the two wiper seals 7, 9.

Longitudinally, this screen 10 has, in the example, the shape of an arc of a cylinder with convexity oriented toward the frontal wall 1a of the casing 1, and the guide is designed such that said screen 10 moves along a circular trajectory.

Figure 2:
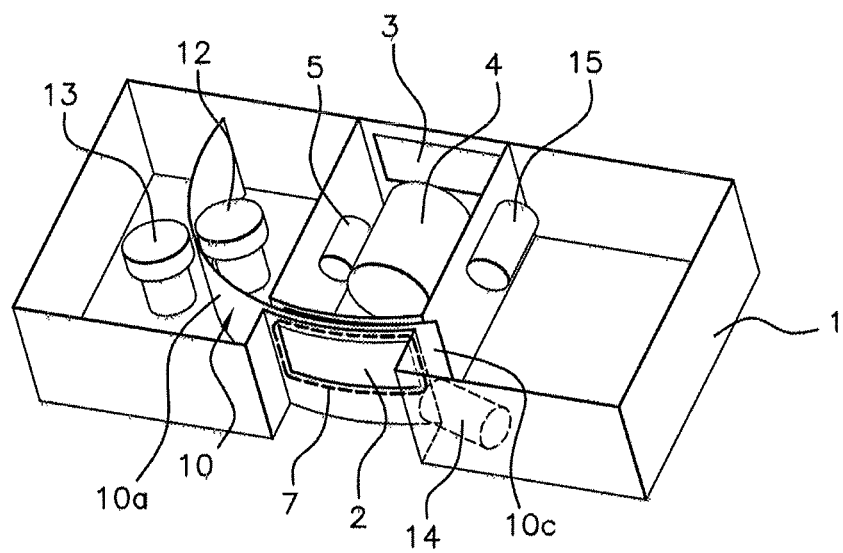
FIG. 2 is a schematic perspective view of this viewing device shown in one of the two imaging positions of the screen.
Figure 3:
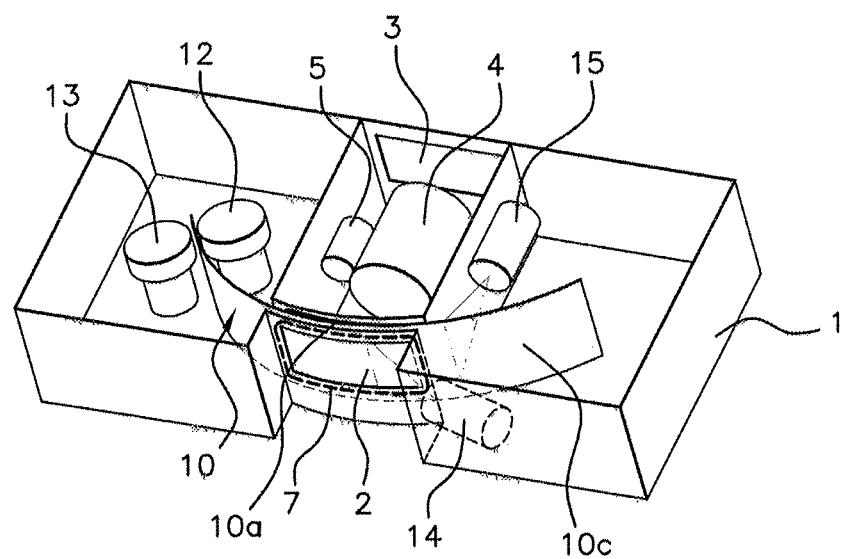
FIG. 3 is a schematic perspective view of this viewing device shown in the second imaging position of the screen.

In addition, this screen 19 has a length that is advantageously suitable for it to be able to be moved longitudinally between two positions, along a back-and-forth path:
- a first position, shown in FIGS. 1 and 3, in which a central surface portion 10a is positioned in the guide next to the imaging window 2, and the end surface portions 10b and 10c extend on either side of said guide, in the compartments C2 and C3, respectively,
- a second position, shown in FIG. 2, in which the end surface portion 10c that extends initially in the compartment C3 is positioned next to the imaging window 2, and the central surface portion 10a and the other end surface portion 10b extend in the compartment C2.

Given these longitudinal movements of the screen 10, the viewing device has, in the example, two motorized assemblies 12, 13 that are disposed in the compartment C2 of the casing 1 on either side of said screen 10, for driving this screen 10 by friction. To this end, each of these motorized assemblies 12, 13 is formed by a motor for driving, in each case, a friction wheel in rotation.

Furthermore, the sealed casing 1, covered by the movable screen 10, described above, is equipped, first and foremost:
- with a camera 4 disposed in the central compartment C1, such that the lens of said camera 4 is aligned with the imaging window 2,
- with a rain sensor 5 intended to detect the presence of liquid and dirt on the external face of the screen 10, of the infrared sensor type, for example, also housed in the central compartment C1.

In addition, the rain sensor 5 is coupled to a light detector 18, such as advantageously the light sensor with which current vehicles are usually equipped, such that the detection level of said rain sensor 5 is adjusted depending on the ambient light measured by said light sensor 18.

Given this coupling, the viewing device is equipped with a processing unit 19 that is generally offset, for example in a door in the "rearview" case, and is programmed to manage the viewing device according to an aspect of the invention, and to which not only the rain sensor 5 and the light sensor 18 are connected for this purpose, but also the other equipment described above, namely: the camera 4 and the two motorized assemblies 12, 13.

The sealed casing 1 is also equipped with means for spraying a cleaning liquid that are disposed so as to spray said liquid respectively onto each of the two faces of the screen 10.

These spraying means comprise, first and foremost, a first spraying nozzle 14 that is disposed so as to spray the cleaning liquid onto the outer face of the surface portion (10a (FIGS. 1 and 3) or 10c (FIG. 2)) of the screen 10 positioned next to the imaging window 2.

To this end, this spray nozzle 14 is positioned in the compartment C3 so as to open into the recess 1b and to deliver the jet of liquid in the direction of the imaging window 2.

These spraying means also comprise a second spraying nozzle 15 disposed in the compartment C3 so as to spray the cleaning liquid onto the inner face of the end surface portion 10c when the latter extends in said compartment C3 (FIGS. 1 and 3). It should likewise be noted that a spraying nozzle may be disposed in the compartment C2 so as to spray the cleaning liquid onto the inner face of the central surface portion 10a when the latter extends in said compartment C2 (FIG. 2).

The spray nozzles 14, 15 are also connected by lines 16 to a distributor 17, the operation of which is managed by the processing unit 19.

Finally, the sealed casing 1 is also equipped with means 11 for heating the screen 10 that are servo-controlled by a temperature sensor (not shown) so as to be triggered when there is a risk of water deposits in the form of mist, frost, snow, etc. forming on said screen 10.

These heating means 11 can be separate from the screen 10 and, for example, be designed to maintain a suitable temperature inside the casing 1 and thus also to keep the screen 10 at a suitable temperature.

These heating means 11 can also be incorporated into the screen 10 and consist, for example, of electric wires embedded in said screen 10.

Whatever the nature thereof, the heating means 11 are also connected to the processing unit 19, and the latter is programmed to prevent the activation of the motorized means 12, 13 when said heating means 11 are operating.

The above-described viewing device therefore consists of a sealed casing 1 incorporating a camera 4, the imaging window 2 of which is covered by a movable transparent screen 10 which provides the sealing of the casing 1 and the cleaning of which ensures that the images transmitted by the camera 4 are clear, this being carried out without interrupting imaging.

The invention claimed is:

1. An outside viewing device for a vehicle, having a camera that is provided with a lens and is housed in a casing having, opposite said lens, a wall, known as the frontal wall, through which there passes an opening forming an imaging window of said camera, said viewing device comprising:
   provided in the casing, an internal partition which is at least substantially parallel to the frontal wall of said housing and through which there passes, next to the imaging window, an opening with dimensions at least substantially the same as those of said imaging window,
   positioned next to one another, at the periphery of the respective openings provided in the frontal wall and the internal partition, two peripheral wiper seals arranged on opposed longitudinal sides of the imaging window to delimit a longitudinal guide between said frontal wall and internal partition,
   a transparent screen with suitable dimensions for sliding longitudinally in the guide delimited by the two peripheral wiper seals, between at least two imaging positions, in each of which different surface portions of said screen are positioned next to the imaging window, such that each of the two peripheral wiper seals forms a seal with and cleans the transparent screen during the longitudinal sliding of the transparent screen, and
   means for moving the screen that are designed to slide the latter between its different positions.

2. The viewing device as claimed in claim 1, wherein the dimensions of the screen and the means for moving said screen are designed to make it possible to slide the latter along a back-and-forth path between two imaging positions: a first position in which a central surface portion is positioned next to the imaging window, and a second position in which an end surface portion is positioned next to said imaging window.

3. The viewing device as claimed in claim 1, wherein the screen and the guide longitudinally have the shape of an arc of a cylinder with convexity oriented toward the frontal wall of the casing.

4. The viewing device as claimed in claim 1, further comprising a sensor for detecting presence of liquid and dirt on the external face of the screen, said sensor being disposed in the casing opposite the imaging window.

5. The viewing device as claimed in claim 4, further comprising means for detecting ambient light that are designed to adjust the detection level of the sensor for detecting the presence of liquid and dirt depending on the ambient light.

6. The viewing device as claimed in claim 4, further comprising control means designed such that the means for moving the screen are activated on the basis of the data supplied by the sensor for detecting the presence of liquid and dirt.

7. The viewing device as claimed in claim 1, further comprising means for spraying a cleaning liquid that are disposed so as to spray said liquid onto the outer face of that surface portion of the screen that is positioned next to the imaging window.

8. The viewing device as claimed in claim 7, wherein the frontal wall of the casing has a recess in which the imaging window is provided, the spraying means for cleaning the outer face of the screen being housed in said casing and disposed so as to open into the recess in the frontal wall.

9. The viewing device as claimed in claim 7, further comprising means for spraying a cleaning liquid that are disposed so as to spray said liquid onto the inner face of a surface portion of the screen that is situated in the casing on the outside of the guide.

10. The viewing device as claimed in claim 1, further comprising means for heating the screen that are servo-controlled by a temperature sensor so as to be triggered when there is a risk of water deposits in the form of mist, frost, snow, etc. forming on said screen.

11. The viewing device as claimed in claim 10, further comprising control means designed to prevent the activation of the means for moving the screen during the operation of the means for heating said screen.

12. The viewing device as claimed in claim 2, wherein the screen and the guide longitudinally have a shape of an arc of a cylinder with convexity oriented toward the frontal wall of the casing.

13. The viewing device as claimed in claim 5, further comprising control means designed such that the means for moving the screen are activated on the basis of the data supplied by the sensor for detecting the presence of liquid and dirt.

14. The viewing device as claimed in claim 8, further comprising means for spraying a cleaning liquid that are disposed so as to spray said liquid onto the inner face of a surface portion of the screen that is situated in the casing on the outside of the guide.

* * * * *